3,213,156
SELECTIVE ISOMERIZATION OF AN ALKENE
WITH A SILANE CATALYST
William A. Harding, Media, Thomas C. Michael, Glenolden, and Harold Shalit, Drexel Hill, Pa., assignors to Air Products and Chemicals Inc., Philadelphia, Pa., a corporation of Delaware
No Drawing. Filed May 18, 1962, Ser. No. 195,943
16 Claims. (Cl. 260—683.2)

The present invention relates to a novel method for converting one isomer of an alkene having at least 4 carbon atoms into another isomer employing certain catalysts, especially to the selective double-bond positional isomerization of an alkene having at least 4 carbon atoms and to double-bond positional isomerization when said alkene is in the presence of a hydrocarbon of similar boiling range.

Isomers of the same substance may have distinctly different boiling points. For example, while butene-1 boils at —6.26° C. trans butene-2 boils at 0.88° C. and cis butene-2 boils at 3.72° C. In like manner, pentene-1 boils at 29.97° C. while trans pentene-2 boils at 36.35° C. and cis pentene-2 boils at 36.94° C. If an isomer such as butene-1 is present in admixture with a hydrocarbon of similar boiling point (i.e., a hydrocarbon having a boiling point within about 5 centigrade degrees) the separation of these materials is difficult by conventional means. Distillation, for example, is not effective on a commercial scale for effecting the separation of butene-1 (B.P. —6.25° C.) and isobutylene (B.P. —6.90° C.) even though isobutylene may be an undesirable substance in dehydrogenation plants. But if the butene-1 is first converted to butene-2 (B.P. 0.88 to 3.72° C.) the separation of the isobutylene-butene-2 mixture is readily effected.

Heretofore, means of isomerizing alkenes, for example, the double-bond positional isomerization of butene-1 to butene-2, have been reported, but side reactions such as cracking, hydrogenation, and skeletal isomerization, also occur.

The invention has for its primary object a process for the selective double-bond positional isomerization of alkenes having at least 4 carbon atoms whereby no, or only a minimum of, accompanying undesired side reactions occur. Another object of the invention is the selective double-bond positional isomerization of such alkenes while they are in the presence of a hydrocarbon having a similar boiling point. A further object of the invention is the selective double-bond positional isomerization of butene-1 to butene-2.

Briefly described, these objects and others, which will become apparent hereinafter, are attained in accordance with the present invention by isomerizing alkenes having at least 4 carbon atoms (e.g., butene, pentene, hexene, etc.) with certain catalysts (hereinafter described) by passing said alkenes over said catalysts at room temperature or a moderately elevated temperature. The catalysts may be employed in the form of a static bed of granular solids, a moving bed of granular solids, or a fluidized suspension of the catalysts using finer granules or powders.

The catalysts which are contemplated by the invention are prepared by treating dried granules of at least one acidic refractory metal oxide with a silane of the formula:

$$R_1R_2R_3SiR_4$$

wherein $R_1$, $R_2$ and $R_3$ are separately selected from the group consisting of hydrogen, halogen and alkyl groups of 1 to 5 carbon atoms and $R_4$ is selected from the group consisting of hydrogen and alkyl groups of 1 to 5 carbon atoms. These catalysts have excellent life expectancy (e.g., above about 3 bbls. charge/lb. catalyst) and include those described in co-pending U.S. patent applications of Harding et al., Serial Numbers 107,645 and 142,021 (filed May 4, 1961, and October 2, 1961, respectively).

The catalysts described in Serial No. 107,645 are prepared by treating dried granules of sorbtive solids consisting essentially of one or more acidic refractory metal oxides, said granules having a cracking activity of at least 15 as determined by the standard CAT-A test, with the vapors of organosilane of the formula:

$$R_5R_6R_7YSi$$

in which each of $R_5$ and $R_6$ is an alkyl group having less than 5 carbon atoms, $R_7$ is selected from the group consisting of hydrogen and alkyl groups having less than 5 carbon atoms and Y is selected from the group consisting of halogen, hydrogen and alkyl groups having less than 5 carbon atoms. Typical illustrations of such catalysts are those obtained by treating alumina-zirconia granules with dimethylchlorosilane; alumina-magnesia silica granules with ethylpropylsilane; silica-zirconia granules with dibutylsilane; eta alumina granules with either trimethylsilane or tetramethylsilane; and silica-alumina granules with trimethylsilane.

Catalysts mentioned in Serial No. 142,021 are prepared by treating granules of solids consisting essentially of one or more aluminaceous refractory metal oxides with a silane of the formula:

$$R_8R_nSiX_{(3-n)}$$

in which $R_8$ and $R_n$ are separately selected from the group of hydrogen and alkyl groups of 1 to 5 carbon atoms, X is halogen and n is a whole number from 0 to 3; at least one of the substituents on Si being halogen or alkyl. Typical illustrations of these catalysts are those obtained by treating silica-alumina granules, activated alumina granules, or alumina-zirconia granules with either methyltrichlorosilane, trimethylchlorosilane, dimethyldichlorosilane or trichlorosilane.

In order that those skilled in the art may better understand how the present invention may be practiced, the following examples are given by way of illustration and not by way of limitation.

*Example I*

Butene-1 was passed through a chamber containing a trimethylsilane treated silica-alumina catalyst at 500° F. and 1 atmosphere of pressure at the rate of 2.1 liquid hourly space velocity (LHSV). No loss of activity in the catalyst during the time tested (150 hours) was discovered. Selective isomerization of the butene-1 to butene-2 occurred with 85% conversion and 100% selectivity.

This product, butene-2 yields a higher octane number alkylate than butene-1 and accordingly, is the preferred isomer of butene for use in alkylation plants.

*Example II*

Example I was repeated using a trimethylsilane treated silica-alumina catalyst, which had a cracking activity of 65 (as determined by the standard CAT-A test) prior to silane treatment. A 90% conversion was obtained with 100% selectivity at a temperature of 300° F., 1 atmosphere of pressure and 1 (LHSV). It was found that catalyst activity after 300 hours of testing had decreased slightly to a level of about 85% conversion.

*Example III*

A charge stock of the following composition:

| | Percent (by vol.) |
|---|---|
| Butene-1 | 59.5 |
| Isobutylene | 30.0 |
| Isobutane | 10.0 |
| Butadiene-1,3 | 0.5 | was passed through a chamber containing a trimethylsilane treated silica-alumina catalyst at 100 lbs./sq. inch pressure (gauge), a flow rate of 1 (LHSV) and operating temperature of 350° F. The product was analyzed by a chromatograph which showed an unadjusted peak indicating a butene-1 conversion of 92%. This value is within experimental error of the calculated equilibrium value of 89% and demonstrated a selectivity of substantially 100%.

Isobutylene polymerization and alkylation to condensed products (e.g., formation of dimers, trimers and alkylates) was approximately 90% by weight and diminished to 50% by weight after 50 hours of operation. Both the isobutylene condensation product and the resulting butene-2 are readily separated from the isobutane and butadiene by fractionation.

During the polymerization of isobutylene some decrease of catalyst activity results; but the catalyst may be returned to original activity by washing it with n-heptane.

*Example IV*

When Example III was repeated using a flow rate of 5 (LHSV) and an operating temperature of 350° F., a 92% conversion of butene-1 to butene-2 and 90% condensation of isobutylene were obtained.

*Example V*

A charge stock of the following composition:

| | Percent |
|---|---|
| Butene-1 | 49.5 |
| Isobutylene | 40.0 |
| Isobutane | 10.0 |
| Butadiene-1,3 | 0.5 | was passed through a chamber containing a trimethylchlorosilane treated silica-alumina catalyst at atmospheric pressure, a flow rate of 1 (LHSV) and operating temperature of 300° F.

A 86% butene-1 conversion with 100% selectivity was obtained which decreased to a 82% conversion after 750 hours of testing.

*Example VI*

A charge stock of the following composition:

| | Percent |
|---|---|
| Butene-1 | 50.0 |
| Isobutylene | 39.5 |
| Isobutane | 10.0 |
| Butadiene-1,3 | 0.5 | was passed with nitrogen diluent (of a nitrogen to oil ratio of 0.5 to 1) through a chamber containing a trimethyl silane treated silica-alumina catalyst at 100 p.s.i.g., a flow rate of 1 (LHSV) and operating temperature of 340° F.

A 90% butene-1 conversion with 100% selectivity was obtained which decreased to 86% after about 600 hours. During the same time, the isobutylene conversion to higher molecular weight products decreased from 91 to 55%.

Another run which was conducted under conditions insuring liquid phase operation, viz., 500 p.s.i.g., and a temperature slightly below 290° F., resulted in butene-1 isomerization and isobutylene condensation of somewhat lower order than obtained in Example VI.

The flow rate (LHSV) of the alkenes over the described catalyst is not important as long as there is sufficient contact between said alkenes and catalyst during each run. Flow rates of from 0.1 to about 20 may be used, but rates of from 1 to 5 LHSV are preferred. In like manner, the invention is not to be limited to the specific temperatures and pressures given in the examples. Temperatures from room temperature up to about 650° F. and pressures within the range of from 1 to 100 atmospheres may be employed. Higher temperatures adversely affect equilibrium and accordingly, it is preferred to employ only moderately elevated temperatures (within the range of 200 to 500° F.).

Obviously, many modifications and variations of the invention as hereinbefore set forth may be made without departing from the spirit and scope thereof, and therefore only such limitations should be imposed as are indicated in the appended claims.

What is claimed is:

1. The process for the selective isomerization of an alkene having at least 4 carbon atoms which comprises contacting a feed material consisting essentially of said alkene with catalyst prepared by treating dried granules of at least one acidic refractory metal oxide with a silane of the formula:

$$R_1R_2R_3SiR_4$$

wherein $R_1$, $R_2$ and $R_3$ are separately selected from the group consisting of hydrogen, halogen and alkyl groups of 1 to 5 carbon atoms and $R_4$ is selected from the group consisting of hydrogen and alkyl groups of 1 to 5 carbon atoms and recovering an isomer of said alkene.

2. The process as claimed in claim 1 wherein the acidic refractory metal oxide is a predominantly aluminaceous solid.

3. The process as claimed in claim 1 wherein the granules of acidic refractory metal oxide are silica-zirconia particles.

4. The process for the selective isomerization of an alkene having at least 4 carbon atoms which comprises contacting a feed material consisting essentially of said alkene with catalyst prepared by treating dried granules of at least one acidic refractory metal oxide with a silane of the formula:

$$R_1R_2R_3SiR_4$$

wherein $R_1$, $R_2$ and $R_3$ are separately selected from the group consisting of hydrogen, halogen and alkyl groups of 1 to 5 carbon atoms and $R_4$ is selected from the group consisting of hydrogen and alkyl groups of 1 to 5 carbon atoms, at a moderately elevated temperature and recovering an isomer of said alkene.

5. The process as claimed in claim 4 wherein said moderately elevated temperature is a temperature within the range of room temperature to 650° F.

6. The process for the selective isomerization of an alkene having at least 4 carbon atoms which comprises contacting a feed material consisting essentially of said alkene with catalyst prepared by treating granules of at least one acidic refractory metal oxide with a silane of the formula:

$$R_1R_2R_3SiR_4$$

wherein $R_1$, $R_2$ and $R_3$ are separately selected from the group consisting of hydrogen, halogen and alkyl groups of 1 to 5 carbon atoms and $R_4$ is selected from the group consisting of hydrogen and alkyl groups of 1 to 5 carbon atoms, at a temperature up to 650° F. and a pressure of 1 to 100 atmospheres and recovering an isomer of said alkene.

7. The process for the selective isomerization of butene-1 to butene-2 wherein a feed stock consisting essentially of butene-1 is contacted with catalyst prepared by treating granules of at least one acidic refractory metal oxide with a silane of the formula:

$$R_1R_2R_3SiR_4$$

wherein $R_1$, $R_2$ and $R_3$ are separately selected from the group consisting of hydrogen, halogen and alkyl groups of 1 to 5 carbon atoms and $R_4$ is selected from the group consisting of hydrogen and alkyl groups of 1 to 5 carbon atoms and recovering butene-2.

8. The process as claimed in claim 7 wherein the butene-1 is contacted with the catalyst at a moderately elevated temperature and atmospheric pressure.

9. The process as claimed in claim 8 wherein said moderately elevated temperature is a temperature within the range of room temperature to 650° F.

10. The process for the selective isomerization of an alkene having at least 4 carbon atoms while said alkene is in admixture with a hydrocarbon of similar boiling point which comprises contacting a feed stock consisting essentially of alkene with catalyst prepared by treating granules of at least one acidic refractory metal oxide with a silane of the formula:

$$R_1R_2R_3SiR_4$$

wherein $R_1$, $R_2$ and $R_3$ are separately selected from the group consisting of hydrogen, halogen and alkyl groups of 1 to 5 carbon atoms and $R_4$ is selected from the group consisting of hydrogen and alkyl groups of 1 to 5 carbon atoms; recovering the isomerization product by fractionation and reactivating the catalyst by washing it with n-heptane.

11. The process as claimed in claim 10 wherein the alkene is contacted with the catalyst at atmospheric pressure and a moderately elevated temperature.

12. The process as claimed in claim 11 wherein the moderately elevated temperature is a temperature within the range of room temperature to 650° F.

13. The process for the selective isomerization of butene-1 to butene-2, while said butene-1 is in the presence of a hydrocarbon of similar boiling point, which comprises contacting a feed stock consisting essentially of butene-1 with catalyst prepared by treating granules of at least one acidic refractory metal oxide with a silane of the formula:

$$R_1R_2R_3SiR_4$$

wherein $R_1$, $R_2$ and $R_3$ are separately selected from the group consisting of hydrogen, halogen and alkyl groups of 1 to 5 carbon atoms and $R_4$ is selected from the group consisting of hydrogen and alkyl groups of 1 to 5 carbon atoms and recovering butene-2.

14. The process as claimed in claim 13 wherein the butene-1 is contacted with the catalyst at a moderately elevated temperature and a pressure of 1 to 35 atmospheres.

15. The process as claimed in claim 14 where said moderately elevated temperature is a temperature within the range of 200 to 500° F.

16. The process as claimed in claim 13 wherein the hydrocarbon of similar boiling point is isobutylene.

References Cited by the Examiner
UNITED STATES PATENTS

| | | | |
|---|---|---|---|
| 2,483,131 | 9/49 | Garrison | 260—683.2 |
| 2,591,367 | 4/52 | McAllister | 260—683.2 |
| 2,722,504 | 11/55 | Fleck | 208—112 |
| 2,927,085 | 3/60 | Gordon et al. | 260—671 |

ALPHONSO D. SULLIVAN, *Primary Examiner.*